United States Patent [19]

Fuchs

[11] Patent Number: 4,742,649

[45] Date of Patent: May 10, 1988

[54] BELT TRACKING ADJUSTMENT MEANS FOR BELT TYPE ABRADING MACHINE

[76] Inventor: Richard W. Fuchs, 17 Deerfield La., Simsbury, Conn. 06070

[21] Appl. No.: 36,710

[22] Filed: Apr. 9, 1987

[51] Int. Cl.⁴ .............................................. B24B 21/20
[52] U.S. Cl. ................................. 51/135 BT; 51/148; 198/814; 474/133; 474/135
[58] Field of Search ............ 51/135 BT, 148, 170 EB; 198/814; 474/109, 111, 133, 135

[56] References Cited

U.S. PATENT DOCUMENTS

| | | | |
|---|---|---|---|
| 3,335,528 | 8/1967 | Bader | 51/148 |
| 3,422,576 | 1/1969 | Hubble | 51/148 |
| 3,497,336 | 2/1970 | Buschman | 51/170 EB |
| 3,664,208 | 5/1972 | Saito | 51/170 EB X |
| 4,011,767 | 3/1977 | Nelson | 474/135 |
| 4,294,044 | 10/1981 | Hansen | 51/135 BT |

*Primary Examiner*—Robert P. Olszewski
*Attorney, Agent, or Firm*—McCormick, Paulding & Huber

[57] ABSTRACT

An improved belt tracking adjustment mechanism for a belt type abrading or other machine having a frame, a drive pulley, an idler pulley and an endless belt trained over the pulleys includes a support member which supports the idler pulley for rotation about an axis fixed relative to the support member. The support member is itself attached to the frame by a single screw which as a first function supports the member for pivotal movement relative to the frame about the screw axis, which extends parallel to the idler pulley axis, to vary the spacing between the idler and drive pulley axes. A spring biases the member in the belt tightening direction and the moments imposed on the member by the belt and spring hold one edge of the member against a flat face of the frame to form another hinge or pivot axis between the frame and member. A second function of the screw is to provide adjustment of the position of the member about this hinge axis to achieve proper tracking of the belt over the pulleys.

7 Claims, 2 Drawing Sheets

BELT TRACKING ADJUSTMENT MEANS FOR BELT TYPE ABRADING MACHINE

BACKGROUND OF THE INVENTION

This invention relates to a belt type abrading machine such as a grinder or sander, or other belt driven machine and deals more particularly with a belt tracking mechanism for such a machine.

Belt grinders or sanders of the general type having a drive pulley, at least one driven or idler pulley and an endless abrasive or other belt trained over the pulleys are old in the art, as evidenced by U.S. Pat. No. 3,497,336 and No. 4,294,044. During the running of such a machine, it is desirable. that the belt track properly over the pulleys, that is, that it maintain a position substantially laterally centered on the belt engaging faces of the pulleys. However, slight alignment errors in the relation of the axes of the pulleys to one another or slight variations in the lengths of the edges of the belt can cause the belt to move off track by shifting laterally to one side or the other from the desired centered position. In some instances, the belt may run completely off of the pulleys.

To allow for correction of the running path of the belt, it has been common practice in belt abrading machines to provide a means for adjusting the inclination of an idler pulley axis relative to the drive pulley axis. Such adjustment means have however tended to pose various problems of their own, including being of a complex, expensive construction and being difficult to operate or fine tune.

It is an object of the present invention to provide a simplified, inexpensive, and easy to operate adjustable belt tracking mechanism wherein a support member for the idler pulley is associated with a single screw which serves to both pivotally connect the support member to the machine frame for movement about an axis generally parallel to the pulley axes to allow for variance in the spacing between the axes of the idler and drive pulleys and to also connect the support member to the frame in such a way that the support member may pivot relative to the frame about an axis or hinge line located in a plane perpendicular to the idler pulley axis to change the inclination of the idler pulley axis relative to the drive pulley axis, with rotation of the screw or of a nut on the screw effecting such change in inclination.

SUMMARY OF THE INVENTION

The present invention resides in a belt type abrading machine having a frame, a drive pulley mounted on the frame for rotation about an axis fixed relative to the frame, an idler pulley, an endless belt abrasive or otherwise trained over the drive pulley and the idler pulley, and a novel means for connecting the idler pulley to the frame whereby the spacing between the axes of the two pulleys may be varied, the idler pulley axis being urged away from the drive pulley axis by a spring to tension the belt, and whereby the inclination of the idler pulley axis relative to the drive pulley axis may be adjusted to bring the belt to a condition of tracking properly over the two pulleys while the machine is running.

The invention more particularly resides in an idler pulley support member being provided for supporting the idler pulley for rotation about an axis fixed relative to the support member. The idler pulley support member is in turn itself connected to the frame by a single screw which rotatably supports the support member for movement relative to the frame about the axis of the screw which extends generally parallel to the pulley axes to allow the idler pulley, as a result of such rotation of the support member relative to the frame and about its screw axis, to be moved toward or away from the drive pulley to loosen or tighten the belt with respect to the pulleys, the support member being further biased by a spring in the belt tightening direction so that the belt will normally be tensioned. The single adjustment screw is also manually operable to angularly adjust the support member relative to the frame about a tracking adjustment axis located in a plane generally perpendicular to the idler pulley axis. The support member and the frame engage one another along the tracking adjustment axis and are held in such engagement by the moments exerted on the support member by the belt and the spring.

DETAILED DESCRIPTION OF THE PREFERRED EMBODIMENTS

Figure 1:
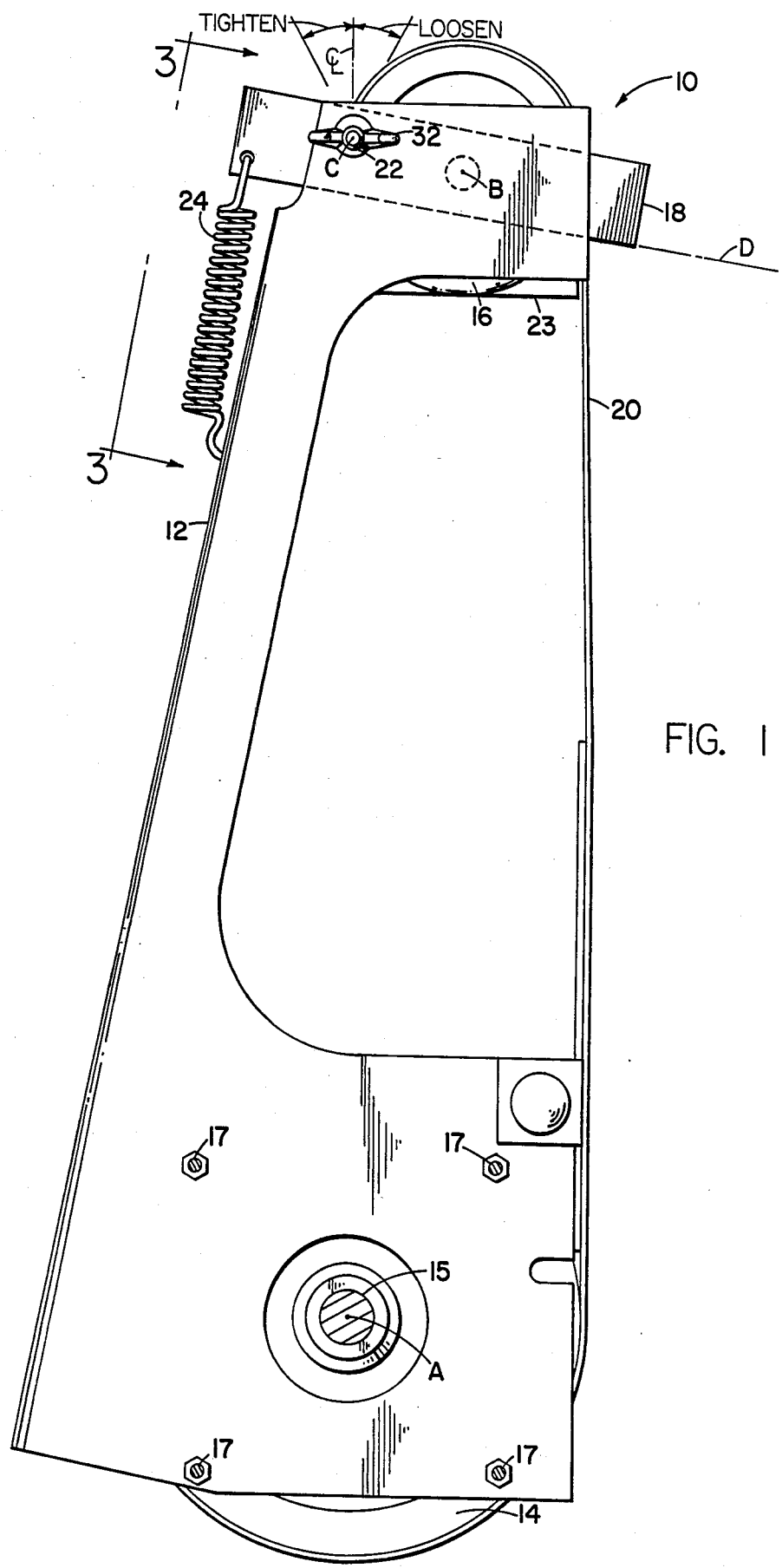
FIG. 1 is a side elevational view of a belt type abrading machine embodying the present invention, and taken on the line 1—1 of FIG. 2.

Turning to the drawings, the figures illustrate a belt type abrading machine, indicated generally at 10, embodying the present invention. The machine 10 comprises a frame 12 and a drive pulley 14 supported for rotation about an axis A fixed relative to the frame. The drive pulley is driven by a suitable power source including an electric drill. The nature of the power source may vary, but in the illustrated case it is an electric motor 13, the drive pulley 14 being fixed to the output shaft 15 of the motor and the frame 12 being fixed to the frame of the motor by four bolts 17. The machine 10 further includes an idler pulley 16 supported by an idler pulley support member 18 for rotation about an axis B fixed relative to the member 18 and substantially parallel to the drive pulley axis A. An endless abrasive faced belt 20 is trained over drive pulley 14 and the idler pulley 16.

The support member 18, as seen in FIG. 1, is of generally rectangular shape. The idler pulley 16 may be supported from it in various different ways without departing from the invention, but in the illustrated case, as seen best in FIG. 3, a stud 19 is fixed to the member 18, as by welding, and rotatably supports the idler pulley 16 for rotation about the axis B of the stud through the intermediary of a bearing, anti-function or otherwise, unit 21. A guard plate 23 carried by and fixed to the outboard end of the stud 19 prevents inadvertent contact with the idler pulley 16 during running of the machine.

Figure 3:
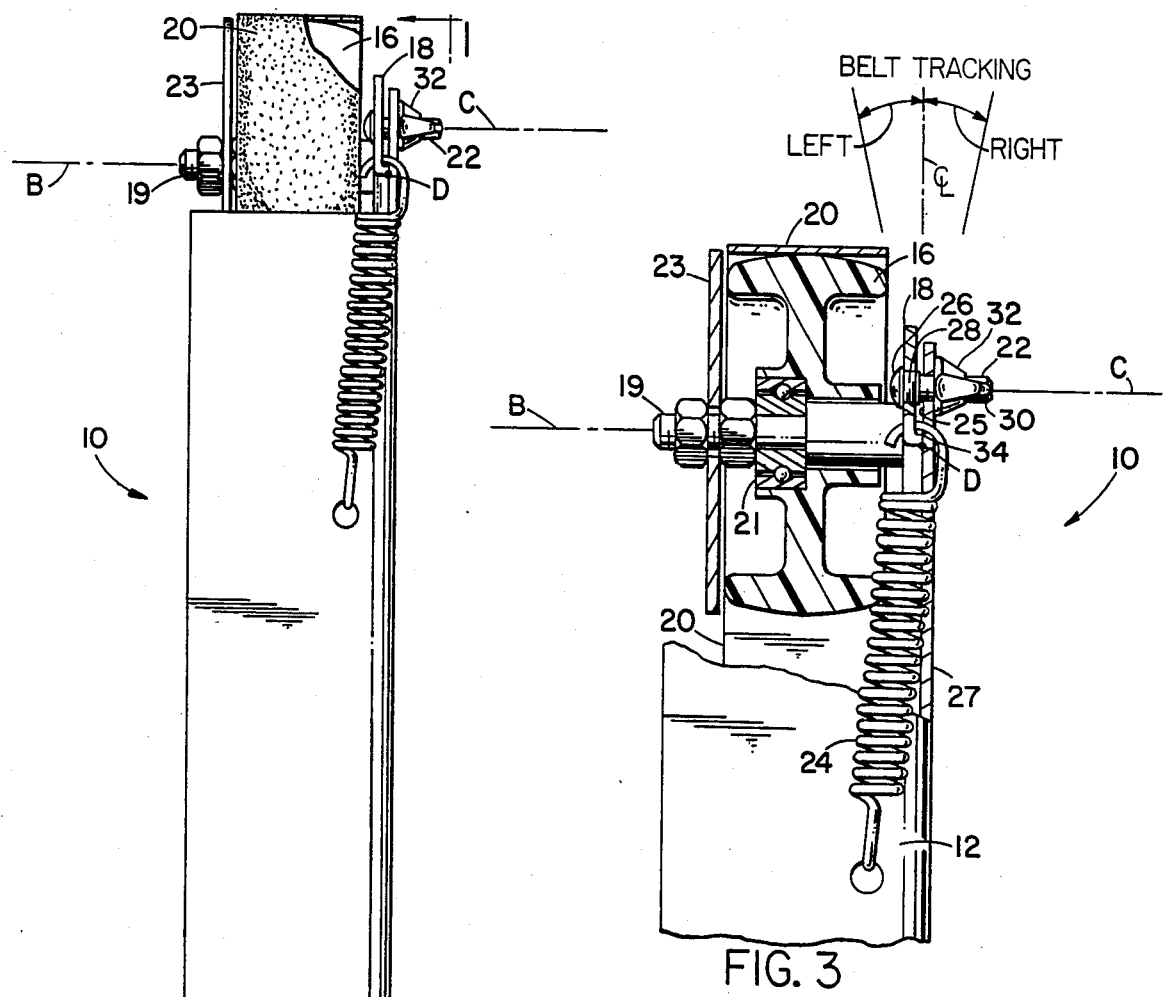
FIG. 3 is a fragmentary view, partly in section, of the upper portion of the machine of FIG. 1 and showing more clearly the belt tracking adjustment means.
Figure 2:
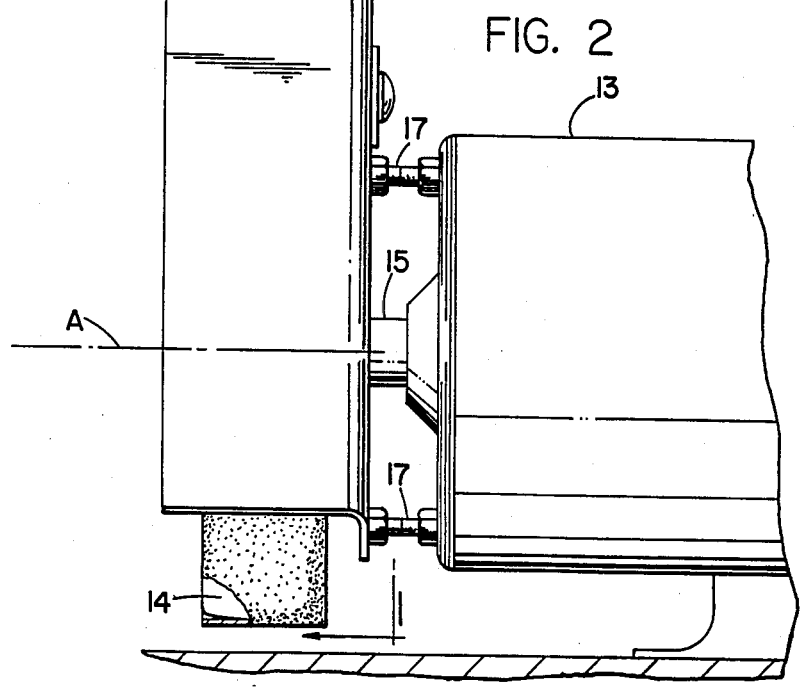
FIG. 2 is rear view of the machine of FIG. 1.

The frame 12, as seen in FIG. 3, has an upper vertical side wall portion 27 located to the right side of the idler pulley 16 and located in a plane generally perpendicular to the idler pulley axis B. The idler pulley support member 18 is located between the side wall portion 27 and the idler pulley and is itself attached to the wall portion 27 by a single screw 22. The screw is oriented so that its longitudinal axis C is generally parallel to the axis B of the idler pulley, and one of its functions is to support the support member 18 for movement relative to the frame 12 about the axis C. The axis B is spaced horizontally and parallel to axis C and therefore such pivotal movement of the support member varies the vertical spacing between the pulley axes A and B. A tension spring 24 is connected between the frame 12 and member 18, as shown in FIGS. 1, 2 and 3, and biases member 18 in the counterclockwise or belt tightening direction about the axis C.

When the abrasive belt 20 is trained over the pulleys 14 and 16, the moment exerted on member 18 by belt 20 and by spring 24 cause the lower edge of member 18 to be held in engagement with face 25 of the frame 12, at D, the face 25 being substantially flat and at right angles to the axis B. The lower edge of the member 18 at D therefore defines a line of engagement or hinge at axis D about which the support member 18 is pivotal as a hinge relative to the frame 12 to vary the inclination of the idler pulley axis B relative to the drive pulley axis A.

A second function of the screw 22 is to adjustably limit the movement of the support member 18 in the left direction, as seen in FIG. 3, about the axis D (that is, the direction the support member is urged about the axis D by the belt tension and spring angular force) to adjustably vary the inclination of the axis B relative to the axis A. The exact structure of the screw and its cooperation with the member 18 and frame 12 to provide this adjustable limiting function may vary, but in the illustrated case the screw 22 is a carriage bolt having a head 26, a square sectioned neck 28 and a threaded shank 30. As shown in FIG. 3, the square neck 28 fits into and through a corresponding square opening in the member 18 and the threaded shank 30 extends loosely through an opening in the frame wall 27 and threadably receives a thumb nut 32. Therefore, by turning the thumb nut 32 in one direction or the other on the shank 22 the member 18 may be moved right or left as seen in FIGS. 2 and 3, about the axis D relative to the frame 12 to vary the inclination of the axis B relative to the axis A.

The member 18 may be made preferably as an essentially flat plate. However, some provision is made to allow for a range of adjustment which extends slightly clockwise, as seen in FIG. 3, beyond the position of the member 18 which would be achieved if the member 18 were merely a flat plate and brought into flat engagement with the surface 25 of the frame. As shown in FIG. 3, such provision is made by forming a slight lip 34 on the lower edge of the member 18 which extends a short distance toward and into engagement with the face 25. The lip 34 therefore slightly spaces the member 18 from the face 25 so that when the member 18 is generally parallel to the face 25, as shown in FIG. 3, the member 18 still may be adjusted to some degree in the clockwise direction about the axis D.

If the edges of the belt are of equal length and if the axes of rotation of the drive pulley 14 and of the idler pulley 16 are truely parallel to one another, and if there are no other alignment errors in the machine, the belt 20 should maintain a position substantially laterally centered with respect to the belt engaging faces of the two pulleys while the machine is running. However, this will often not be the case when a new belt is first put onto the machine or is reversed. Instead a new belt may tend to move off track by shifting laterally to one side or the other of the desired centered position when the machine is put into operation. Also, after the machine has been run for some time stretching of the belt or other changes may occur which causes the belt to tend to shift laterally.

The present invention allows for simple and easy correction of this belt shifting problem through the adjustment screw 22. That is, the thumb nut 32 on the screw is manually operatable so that by turning it in one direction or the other on the screw the idler pulley axis B is tilted in one direction or the other relative to the axis A of the drive pulley. Further, such adjustment can be made slowly as the machine operates to allow the operator to observe the effect of the adjustment and to easily achieve the degree of adjustment necessary to bring the belt into the desired location. The adjustment screw 22, as mentioned, adjustably limits the positioning of the support member 18 relative to the frame 12 about the axis D and it also permits the member 18 to rotate about the axis C to change the spacing between the two pulleys to accommodate the slight differences or changes in the length of the belt and to maintain tension in the belt through the spring 24. Further, as the member 18 rotates about the axis C the lower edge of the member 18 which defines the axis D slides over the flat face 25 of the frame 12 so as not to interfere with or prevent such rotation.

I claim:

1. A belt tracking adjustment means for a belt type abrading or other machine having a frame, a drive pulley, at least one idler pulley and an endless belt trained over said pulleys, said tracking adjustment means comprising a support member which supports said idler pulley for rotation about an axis fixed relative to said support member, a single screw having a longitudinal axis and which supports said support member for movement relative to said frame about said longitudinal screw axis, said screw axis extending generally parallel to the axes of said idler pulley and said drive pulley so that rotation of said support member in one direction or the other about said screw axis varies the spacing between said idler and drive pulley axes, a spring connected between said support member and said frame biasing said support member in the belt tightening direction about said screw axis, said frame having a substantially flat face opposite said support member located in a plane generally at right angles to said idler pulley axis and said support member having an edge which is held in engagement with said flat frame face by the moments exerted on said support member by said spring and belt, said support member being movable about said edge relative to said frame to vary the inclination of said idler pulley axis relative to the axis of said drive pulley, and said screw including means for adjustably limiting the position of said support member relative to said frame and about said edge in the direction toward which said member is biased about said edge by the moments imposed on it by said belt and said spring.

2. A belt tracking adjustment means as defined in claim 1 further characterized by said edge of said support member which engages said flat face of said frame being located between the axes of said idler and drive pulleys and extending generally at right angles to the plane containing said idler and drive pulley axes.

3. A belt tracking adjustment means as defined in claim 2 further characterized by said frame having a wall opposite said support member which defines said flat face, said screw being nonrotatably carried by member and having a threaded shank passing loosely through an opening in said frame wall, and a thumb nut threadably received on said shank of said carriage bolt on the side of said wall opposite said flat face.

4. A belt type abrading or other machine comprising a frame, a drive pulley rotatably mounted for movement relative to said frame about an axis fixed to said frame, at least one idler pulley, an idler pulley support member, means on said support member supporting said idler pulley for rotation about an axis fixed relative to said support member, a single screw attaching said idler pulley support member to said frame in spaced relation to said drive pulley and so that said idler pulley axis extends generally parallel to said drive pulley axis, said screw having a longitudinal axis extending generally parallel to said idler pulley axis and said support member being rotatable relative to said frame about said longitudinal axis of said screw to vary the spacing between said idler and drive pulley axes, a belt trained over said idler and drive pulleys, a spring connected between said support member and said frame and biasing said support member in the belt tightening direction about said screw axis, said support member and said frame being further constructed and arranged so that said support member and frame are engageable with one another along a slidable hinge axis extending generally perpendicular to the plane containing said idler and drive pulley axes, said idler pulley and said spring being further so connected with said support member that the resulting moments imposed on said support member by said belt and said spring force angles urge said support member into engagement with said frame along said hinge axis and bias said support member in one direction about said hinge axis, and said screw including means for adjustably limiting the position of said support member relative to said frame about said hinge axis in the direction toward which said support member is urged by the moments exerted thereon by said belt and said spring, to vary the inclination of said idler pulley axis relative to the axis of said drive pulley.

5. A belt type abrading or other machine as defined in claim 4 further characterized by said frame having a wall generally at right angles to said idler pulley axis located to one side of said idler pulley and having a flat face facing said idler pulley, said support member being located between said frame wall and said idler pulley, and said idler pulley being connected to said support member by means of a stud shaft fixed to said support member and extending from said support member in the direction away from said frame wall, said idler pulley being rotatably supported on said stud shaft.

6. A belt type abrading or other machine as defined in claim 5 further characterized by said drive and idler pulley axes being vertically spaced from one another, said screw axis being horizontally spaced from said idler pulley axis and said spring being a tension spring connected between said frame and a point on said support member which is located horizontally on the opposite side of said screw axis from said idler pulley axis.

7. A belt type abrading or other machine as defined in claim 6 further characterized by said support member having a substantially straight edge located vertically between said idler pulley and drive pulley axes which edge engages said flat face of said frame to define said hinge axis.

* * * * *